United States Patent [19]
McCaully

[11] 3,875,213
[45] Apr. 1, 1975

[54] INTERMEDIATES FOR THE SYNTHESIS OF 1,4-BENZODIAZEPIN-2-ONES

[76] Inventor: Ronald J. McCaully, 1 Limekiln Dr., Malvern, Pa. 19355

[22] Filed: Jan. 30, 1974

[21] Appl. No.: 438,114

Related U.S. Application Data
[62] Division of Ser. No. 294,724, Oct. 3, 1972.

[52] U.S. Cl. ...... 260/490, 260/239.3 T, 260/465 D, 260/488 J
[51] Int. Cl. ........................................... C07c 131/00
[58] Field of Search ............ 260/490, 465 D, 561 B

[56] References Cited
UNITED STATES PATENTS

| | | | |
|---|---|---|---|
| 3,405,132 | 10/1968 | Bell | 260/490 |
| 3,441,607 | 4/1969 | Bell | 260/490 |

*Primary Examiner*—Vivian Garner
*Attorney, Agent, or Firm*—Robert Wiser

[57] ABSTRACT

2-Aminobenzophenone anti-oximes are converted to heretofore undescribed dihydroxyacetanilide derivatives, which are useful for preparing known 1,4-benzodiazepin-2-ones.

5 Claims, No Drawings

INTERMEDIATES FOR THE SYNTHESIS OF 1,4-BENZODIAZEPIN-2 ONES

This is a division of application Ser. No. 294,724, filed Oct. 3, 1972.

BACKGROUND OF THE INVENTION

This invention relates to new compositions of matter and to new processes for preparing 3-substituted-1,4-benzo-diazepin-2-ones wherein the substituent in the 3 position is attached by one of its atoms is other than carbon. Compounds of this class are well-known for their pharmaceutical efficacy, thus, for example, several of this class of compounds are currently being marketed as psycholeptic agents.

Members of this chemical class may be prepared by the rearrangement of a 1,4-benzodiazepin-2-one 4-oxide, upon treatment with an acid chloride or acid anhydride with subsequent transformations of the so obtained 3-acyloxy derivative as in, for example, U.S. Pat. No. 3,296,249. Other means for preparing these valuable compounds have involved the elaboration of suitably substituted or unsubstituted 2-aminobenzophenones and 2-aminobenzophenone oximes into the desired products [see for example A. Stempel, E. Reeder, and L. H. Sternbach, J. Org. Chem. 30, 4267 (1965); U.S. Pat. No. 3,468,878; U.S. Pat. No. 3,632,644].

The present invention provides a new and practical means for converting suitably substituted or unsubstituted 2-aminobenzophenone anti-oximes into 3-substituted-1,4-benzodiazepin-2-ones wherein the 3-substituent is attached by one of its atoms which is other than carbon. The instant invention also provides heretofore unknown compounds which are, for example, useful as intermediates for the production of 3-substituted-1,4-benzodiazepin-2-ones.

SUMMARY OF THE INVENTION

The invention sought to be patented in a principal composition aspect of the invention resides in the concept of a compound of the formula

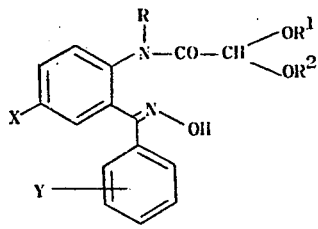

wherein R is hydrogen or alkyl of from 1 to 6 carbon atoms, $R^1$ and $R^2$ may be the same or different and are carboxylic acyl of from 1 to 6 carbon atoms, and X and Y may be the same or different and are selected from the group consisting of hydrogen, halogen, nitro, trifluoromethyl, thiomethyl, cyano, alkyl of from 1 to 6 carbon atoms and alkoxy of from 1 to 6 carbon atoms.

The tangible embodiments of the principal composition aspect of the invention possess the inherent general physical properties of being pale yellow to white crystalline solids, are substantially insoluble in water, and are generally soluble in such organic solvents as benzene, ethyl acetate, chloroform, and methanol. Examination of the compounds produced according to the hereinafter described process reveals, upon infrared, ultraviolet, proton magnetic resonance, and mass spectrographic analysis, spectral data supporting the molecular structure hereinbefore set forth. For example, the infrared spectrum exhibits three carbonyl absorptions, two of which are attributable to esters and one to an amide.

The aforementioned physical characteristics, taken together with the nature of the starting materials and the elemental analysis of the products obtained therefrom, further confirm the molecular structure hereinbefore set forth.

The tangible embodiments of the principal composition aspect of the invention possess the applied use characteristic of being intermediates for making compositions which possess the inherent applied use characteristic of exerting psycholeptic effects in animals as evidenced by pharmacologic evaluation according to standard test procedures.

The invention sought to be patented in a second composition aspect of the invention resides in the concept of a compound of the formula

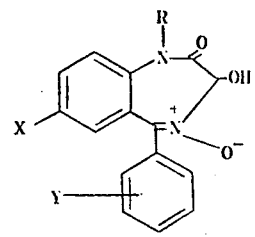

wherein R is hydrogen, or alkyl of from 1 to 6 carbon atoms, and X and Y may be the same or different and are selected from the group consisting of hydrogen, halogen, nitro, trifluoromethyl, thiomethyl, cyano, alkyl of from 1 to 6 carbon atoms, and alkoxy of from 1 to 6 carbon atoms.

The tangible embodiments of the second composition aspect of the invention possess the inherent physical properties of being generally crystalline solids, however, some of these compounds have been demonstrated to be unstable existing only in acidic solution, for example, trifluoroacetic acid. They are substantially insoluble in water and in such organic solvents as benzene, ethyl acetate, and chloroform. The heterocyclic ring has been observed to open in polar organic solvents such as acetonitrile, dimethyl sulfoxide, dimethyl formamide and the like. Examination of the compounds produced according to the hereinafter described process reveals, upon infrared and mass spectrographic analysis, spectral data supporting the molecular structure hereinbefore set forth.

The aforementioned physical characteristics taken together with the nature of the starting materials and the elemental analysis of the products obtained therefrom further confirm the molecular structure hereinbefore set forth.

The tangible embodiments of the second composition aspect of the invention possess the applied use characteristic of being intermediates for making compositions which possess the inherent applied use characteristic of exerting psycholeptic effects in animals as evidenced by pharmacologic evaluation accordig to standard test procedures.

The invention sought to be patented in a third composition aspect of the invention resides in the concept of the product obtained by treating a compound of formula

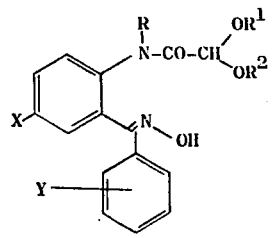

wherein R is hydrogen or alkyl of from 1 to 6 carbon atoms, $R^1$ and $R^2$ may be the same or different and are carboxylic acyl of from 1 to 6 carbon atoms, and X and y may be the same or different and are selected from the group consisting of hydrogen, halogen, nitro, trifluoromethyl, thiomethyl, cyano, alkyl of from 1 to 6 carbon atoms and alkoxy of from 1 to 6 carbon atoms; with a substantially stoichiometric amount of alkali or alkaline earth metal hydroxide.

The tangible embodiments of the third composition aspect of the invention possess the inherent physical properties of being generally crystalline solids, are substantially insoluble in water, and are generally soluble in such organic solvents as benzene, ethyl acetate, chloroform, and methanol. Examination of the compounds produced according to the hereinafter described process reveals, upon infrared and proton magnetic resonance spectographic analysis, spectral data indicative of the molecular structure. For example, an absorption attributable to the protons of the lower carboxylic acyl groups are absent in the proton magnetic resonance spectrum.

The tangible embodiments of the third composition aspect of the invention possess the applied use characteristic of being intermediates for making compositions which possess the inherent applied use characteristic of exerting psycholeptic effects in animals as evidenced by pharmacological evaluation according to standard test procedures.

The invention sought to be patented in a principal process aspect of the invention resides in the concept of a process comprising treating a compound of the formula

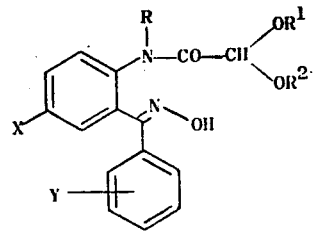

wherein R is hydrogen or alkyl of from 1 to 6 carbon atoms, $R^1$ and $R^2$ may be the same or different and are carboxylic acyl of from 1 to 6 carbon atoms, and X and y may be the same or different and are selected from the group consisting of hydrogen, halogen, nitro, trifluoromethyl, thiomethyl, cyano, alkyl of from 1 to 6 carbon atoms and alkoxy of from 1 to 6 carbon atoms; with a substantially stoichiometric amount of alkali or alkaline earth metal hydroxide.

The invention sought to be patented in a second process aspect of the invention resides in the concept of a process for preparing a compound of the formula

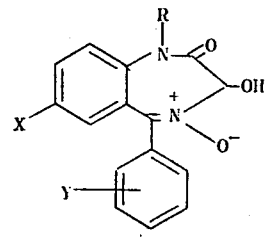

wherein R is hydrogen or alkyl of from 1 to 6 carbon atoms, and X and Y may be the same or different and are selected from the group consisting of hydrogen, halogen, nitro, trifluoromethyl, thiomethyl, cyano, alkyl of from 1 to 6 carbon atoms and alkoxy of from 1 to 6 carbon atoms; which comprises treatment of a composition of matter obtained by treating a compound of the formula

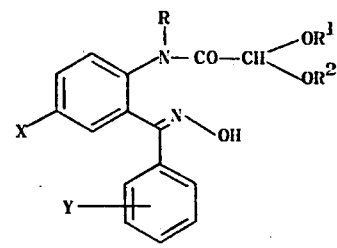

wherein R, X and Y and as defined above and $R^1$ and $R^2$ are carboxylic acyl of from 1 to 6 carbon atoms with a substantially stoichiometric amount of alkali or alkaline metal hydroxide; with trifluoroacetic acid or thallous ethoxide.

The invention sought to be patented in a third process aspect of the invention resides in the concept of a process for preparing a compound of the formula

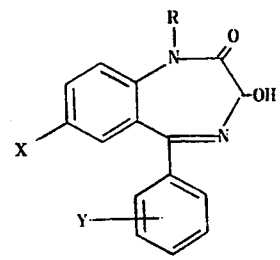

wherein R is hydrogen or alkyl of from 1 to 6 carbon atoms, and X and Y may be the same or different and are chosen from the group consisting of hydrogen, halogen, trifluoromethyl, thiomethyl, alkyl of from 1 to 6 carbon atoms, and alkoxy of from 1 to 6 carbon atoms; which comprises:

a. treating a compound of the formula

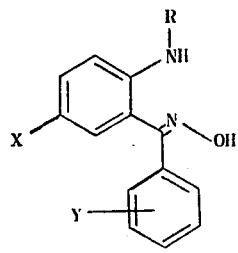

wherein X, Y and R and as defined above, with a compound of the formula

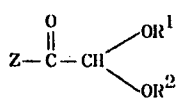

wherein $R^1$ and $R^2$ may be the same or different and are carboxylic acyl of from 1 to 6 carbon atoms, and Z is chlorine or bromine; to form a compound of formula

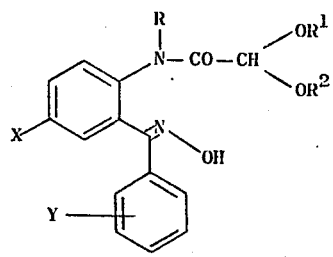

b. treating the thus formed amide with a substantially stoichiometric amount of alkali or alkaline earth metal hydroxide;

c. treating the thus formed composition of matter with trifluoroacetic acid or thallous ethoxide to produce a compound of the formula

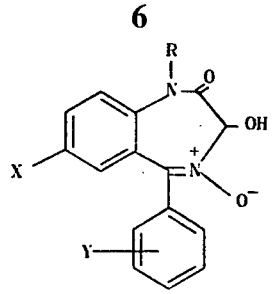

and d. treating the thus formed benzodiazepin-2-one-N-oxide with elemental hydrogen in the presence of a noble metal catalyst.

The invention sought to be patented in a third process aspect of the invention resides in the concept of a process for preparing a compound of the formula

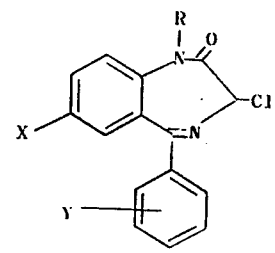

wherein R is hydrogen or alkyl of from 1 to 6 carbon atoms, and X and Y may be the same or different and are chosen from the group consisting of hydrogen, halogen, nitro, cyano, trifluoromethyl, thiomethyl, alkyl of from 1 to 6 carbon atoms, and alkoxy of from 1 to 6 carbon atoms; which comprises treating a compound of the formula

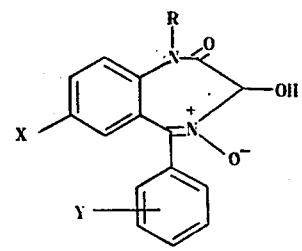

wherein R, X, and Y are as defined above with phosphorous trichloride.

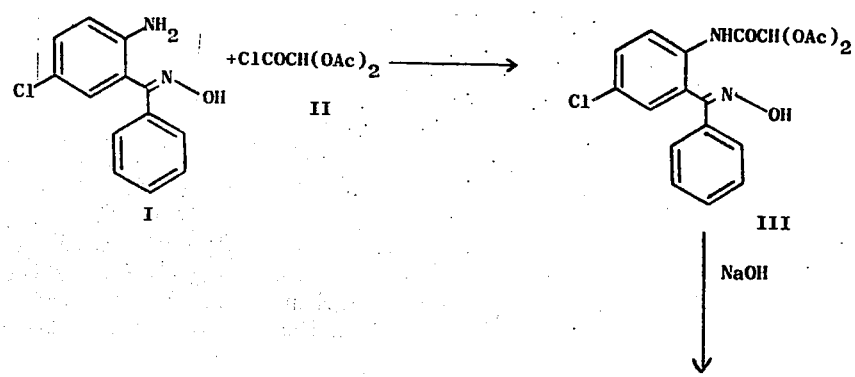

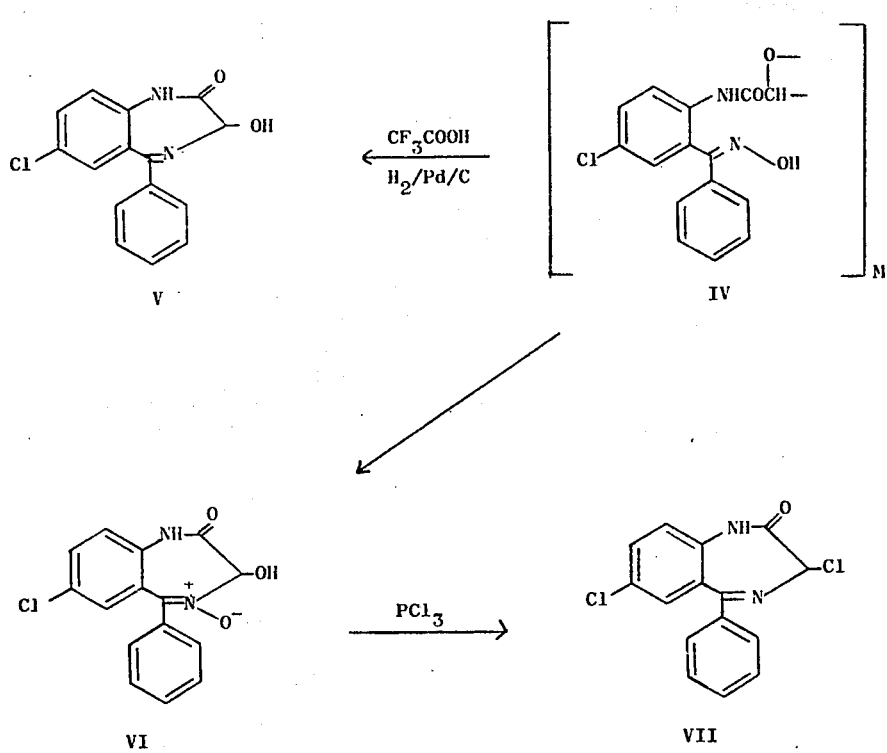

Figure 1

DESCRIPTION OF THE INVENTION

In describing the invention, reference will be made to FIG. 1, which illustrates schematically the novel processes of the invention. For reasons of convenience, the processes are described utilizing specific embodiments of the invention, which embodiments are identified by use of Roman numerals. The use of specific embodiments to illustrate the invention is merely descriptive and is not intended to delimit the scope of the invention.

Referring now to FIG. 1, one of the starting materials utilized in the processes of the instant invention, is the anti-oxime I. The term anti-oxime, when referred to in this invention, indicates that the oxime hydroxyl group is in the anti configuration with respect to the aminophenyl group. Those skilled in the art of organic chemistry will recognize that oximes may exist in two possible isomeric configurations. The anti-oximes, required for the instant invention, may be obtained, for example, by converting the corresponding benzophenone into a mixture of syn and anti oximes by treatment with hydroxylamine salts under a variety of conditions. The desired anti oxime can then be obtained from the syn-anti mixture, for example by the procedure of G. F. Field, W. J. Zally, and L. J. Sternbach, J. Org. Chem. 30, 3957 (1965). The other required starting material is α,α-diacetoxy-acetyl chloride II. The preparation of II is discussed in my U.S. Pat. No. 3,678,032.

Again referring to FIG. 1, the starting materials I and II are condensed to produce the amide oxime III. This condensation has been found to proceed efficiently when carried out in a two phase solvent system. Thus, for example, a solution of II in a water immiscible solvent such as methylene chloride, benzene, chloroform, or ether, preferably methylene chloride; is added to a rapidly stirred mixture of I, also in a water immiscible solvent such as methylene chloride, benzene, chloroform, or ether, preferably methylene chlorie and an aqueous basic solution such as saturated sodium bicarbonate at a temperature of from about 0°C to about 25°C, preferably 5°C. It will be obvious to those skilled in the art, that reaction temperatures below 0°C or above 25°C may be utilized, at times, for this condensation. The addition is usually carried out over a period of about 1 hour, however the addition time is not critical. The mixture is then allowed to stir at temperatures of from about 0°C to about 30°C for from about 1 hour to about 6 hours and the product is isolated by separation of the organic phase from the aqueous phase, and evaporation of the solvent. It will be obvious to those skilled in the art of organic chemistry, that for the purposes of this condensation, a variety of substituents may be present in the anti-oxime which substituents will have little or no affect on the course of the condensation. It will also be obvious that the acid chloride II could be replaced by an acid bromide and that the ester groups of II could be varied, also without interfering with the course of the condensation reaction. It will be obvious to those skilled in the art, that other reaction conditions may also be utilized for the condensation of I and II. For example, contacting I and II in a nonreactive solvent such as methylene chloride at reflux temperature has been shown to produce III. Other solvents and reaction temperatures will suggest themselves to those skilled in the art.

The amide oxime III is next treated with a substantially stoichiometric amount of aqueous base solution. This treatment is preferably carried out by dissolving III in a non-reactive, water miscible solvent such as 1,2-dimethoxyethane and treating this solution, at about room temperature, with sufficient sodium hydroxide solution to provide substantially 2 equivalents of base, a large excess of base is to be avoided. The structure of the product obtained from the basic treatment of III is as yet undefined; however, taking into account the structure of III, the stoichiometry of the reaction between III and base to produce this product and physical data obtained for this material such as elemental analysis, infrared and proton magnetic resonance spectra; the structure indicated is a polymeric one in which the ester groups have been cleaved (i.e. IV wherein M is an integer). Other aqueous basic solutions, for example, potassium hydroxide, calcium hydroxide or even quaternary amines hydroxides such as tetramethylammonium hydroxide could be utilized for this treatment.

The composition, IV, is next dissolved in trifluoroacetic acid at about room temperature, 10% palladium on carbon catalyst is added and the mixture hydrogenated at 40 psi until no additional uptake of hydrogen is observed. In this manner, 7-chloro-1,3-dihydro-3-hydroxy-5-phenyl-2H-1,4-benzodiazepin-2-one, V, is obtained directly from IV. Compound V is the medicament, oxazapam, in medical use throughout the world as a psycholeptic agent. Those skilled in the art will appreciate, that other noble metal catalysts, for example platinum, may be utilized for this reduction, and that the pressure of hydrogen gas used may vary from atmospheric to any that is deemed appropriate for the catalyst being utilized.

Alternatively, the composition IV may be dissolved in trifluoroacetic acid at about room temperature and allowed to stir for about 15 hours; or IV may be dissolved at about room temperature in a non-reactive solvent such as dioxane, tetrahydrofuran, methylene chloride, and the like, and treated with thallous ethoxide. Suitable work up of either of these alternates permits the isolation of the N-oxide, VI. Of the two alternate procedures, treatment with trifluoroacetic acid is preferred, mainly because the product VI is more readily isolable from this reaction mixture.

The particular N-oxide VI, has been found to be stable and isolable; however, other compounds of this type exist only in acid solution (e.g. trifluoroacetic acid) and cleavage of the heterocyclic ring has been observed to take place on their attempted isolation. Reduction of the N-oxide junction of compound VI with concomitant replacement of the 3-hydroxy junction by chlorine can be effected by treatment of VI with phosphorous trichloride in refluxing methylene chloride. In this manner compound VII is produced. Those skilled in the art will recognize the obvious, well-known utility of the compound VII for preparing 3-substituted-1,4-benzodiazepin-2-ones in which the 3-substituent is attached by one of its atoms which is other than carbon. Thus treatment of VII with amines by known methods produces 3-amino-1,4-benzodiazepin-2-ones; treatment of VII with alkanols by known methods produces 3-alkoxy-1,4-benzodiazepin-2-ones, and treatment of VII with metal alkanoylates by known methods produces 3-alkanoyloxy-1,4-benzodiazepin-2-ones. Those skilled in the art will recognize that in the case of an unstable congener of VI, the majority of the trifluoroacetic acid may be removed (e.g. by evaporation at reduced pressure) and the residue taken up in methylene chloride, and treated with phosphosous trichloride at the boiling point of the mixture. Isolation and possible decomposition of this material would thus be avoided.

The following examples illustrate the best mode contemplated by the inventor for carrying out the processes of the invention and for using as intermediates the compositions of the invention.

EXAMPLE 1

2,2-Dihydroxyacetylchloride, diacetate II

Glyoxylic acid, monohydrate (64.0 g.) and 480 ml. (ca 520 g.) of acetic anhydride and 160 ml. of glacial acetic acid were combined and heated on a steam bath for 2 hr. The solvents were removed on a rotary evaporator and the remaining traces of acetic acid and acetic anhydride were removed by codistillation with 100 ml. of toluene. The residue was dissolved in 350 ml. of methylene chloride and treated with 180 ml. (298 g.) of thionyl chloride. The mixture was heated at gentle reflux for 20 min. and evaporated on a rotary evaporator. An additional 100 ml. of methylene chloride was added and reevaporated to remove traces of volatile reactants. The 2,2-dihydroxyacetylchloride, diacetate could be condensed with various amines without further purification. A portion of the material was purified by vacuum distillation [b.p. 58°–59° (0.5 mm.), $n_D^{25}$ 1.4276]. The proton nuclear magnetic resonance spectrum ($CDCl_3$) exhibited two peaks at 2.21 $\delta$ and 6.91 $\delta$ in ratios of 6:1.

Analysis for $C_6H_7ClO_5$
Calculated:C, 37.03;H, 3.63.
Found:C, 36.99;H, 3.90.

EXAMPLE 2

2'-Benzoyl-4'-chloro-2,2-dihydroxyacetanilide diacetate, anti-oxime III

To a stirred, chilled mixture of 52.0 g (0.209 mole) of 2-amino-5-chlorobenzophenone, anti-oxime dissolved in 1600 ml of dichloromethane and 260 ml of saturated sodium bicarbonate solution was added dropwise a solution of 47.6 g (0.245 mole) of 2,2-dihydroxyacetal chloride diacetate in 240 ml of dichloromethane. The mixture was then stirred for one hour at 26° and the layers were separated. After the dichloromethane extract was washed with saturated salt solution and dried by passage through cotton, it was evaporated on the rotary evaporator to give 74.4 g (88%) of light yellow crystalline solid, mp. 138°–142°. The product, 2'-benzoyl-4'-chloro-2,2-dihydroxyacetanilide diacetate, anti-oxime, was recrystallized from cyclohexane-dichloromethane (mp. 143°–145°).

Analysis for $C_{19}H_{17}ClN_2O_6$
Calculated:C, 56.37; H,4.23; N, 6.92.
Found:C, 56.03; H,4,35; N, 7.22.

The infrared spectrum (KBr) exhibited significant bands at 3.08 $\mu$, 5.6 and 5.65 doublet (acetates), 5.90 (amide CO), and 6.52, among others.

The n.m.r. spectrum ($CDCl_3$) had peaks at $\delta$ 2.15 (s, 6), 6.88 (d, 1, J=3Hz), 7.05 (s, 1), 7.15–7.6 (m, 7), 7.65 (1, d, J=9Hz), 11.5 (s, 1).

EXAMPLE 3

Hydrolysis of 2'-benzoyl-4'-chloro-2,2-dihydroxyacetanilide, anti-oxime, diacetate, the preparation of compound IV Sodium hydroxide solution (4 N, 16.5 ml) was added dropwise to a stirred solution of 12.12 g (30 mmole) of 2'-benzoyl-4'-chloro-2,2-dihydroxyacetanilide diacetate, anti-oxime in 105 ml of 1,2-dimethoxyethane at 26°. The mixture was stirred at 26° for 45 min and evaporated on the rotary evaporator. Water and ether were added to the residue, agitated, and separated. The water layer was further extracted with three portions of ether. The combined ether extracts were washed with water, saturated sodium chloride solution, and dried over anhydrous magnesium sulfate. Evaporation of ether afforded a light yellow oil IV. Addition of a small quantity of ether caused 6.0 g of product to separate as crystals (mp. 192°–193°).

Analysis for $C_{15}H_{11}ClN_2O_3$
Calculated:C, 59.51;H, 3.66; N, 9.25.
Found:C, 59.68;H, 4.06; N, 8.79.

The infrared spectrum (KBr) exhibited bands at 2.95 $\mu$ to 3.25 broad, shoulder at 5.80, strong peaks at 5.87, 5.98 and 6.33 $\mu$.

The nuclear magnetic resonance spectrum ($d_6$-DMSO) had absorptions at 8.50-6.1 ($m$, 1), 6.8–7.7 ($m$, 7), 8.1–8.9 ($m$, 1) and 10.9–12.1 ($m$, 1).

EXAMPLE 4

7-Chloro-1,3-dihydro-3-hydroxy-5-phenyl-2H 1,4-benzodiazepin-2-one 4-oxide

The product (4.0 g) from the hydrolysis of 2'-benzoyl-4'-chloro-2,2-dihydroxyacetanilide diacetate, anti-oxime, IV, was added to 60 ml of trifluoroacetic acid, and the mixture was stirred at 26° for 15 hr. The excess trifluoroacetic acid was evaporated on a rotary evaporator, and traces were removed by a stream of nitrogen. Addition of acetonitrile to the residue caused it to crystallize. Filtration of the mixture of solvent and crystals, after brief chilling, afforded 2.8 g of 7-chloro-1,3-dihydro-3-hydroxy-5-phenyl-2H-1,4-benzodiazepin-2-one 4-oxide, mp. 174°–175° dec.

Analysis for $C_{15}H_{11}ClN_2O_3$:
Calculated:C, 59.51; H, 3.66; N, 9.23.
Found:C, 59.09; H, 3.74; N, 9.34.

The i.r. spectrum (KBr) exhibits bands at 3.12 $\mu$, 5.80 (shoulder) and 5.85 $\mu$ among other bands.

Recrystallization of the product by dissolving one gram in 125 ml of refluxing acetonitrile, concentrating the solution to 100 ml and cooling afforded crystals (mp. 201°–203° dec) having the following analysis:

Analysis for $C_{15}H_{11}ClN_2O_3$:
Calculated:C, 59.51; H, 3.66; N, 9.25; Cl, 11.71
Found:C, 59.48; H, 3.70; N, 9.42; Cl, 11.30

The infrared spectrum (KBr) of this material had bands at 2.95–3.3 (broad), 5.85 (shoulder) and strong bands at 5.88, 5.99, and 6.54 among other bands. The infrared spectrum of the recrystallized material indicates that the heterocyclic ring has been opened and it is very similar to the infrared spectrum of the composition of Example 3.

The n.m.r. spectrum ($d_6$-DMSO) had absorptions at 5.1–5.85 ($m$, 1), 6.9–7.9 ($m$, 7), 8.1–8.4 ($m$, 1), 10.8–12.1 ($m$, 2).

EXAMPLE 5

7-Chloro-1,3-dihydro-3-hydroxy-5-phenyl-2H-1,4-benzodiazepin-2-one, V, from hydrogenation of the hydrolysis product of 2'-benzoyl-4'-chloro-2,2-dihydroxy acetanilide diacetate The hydrolysis product of 2'-benzoyl-4'-chloro-2,2-dihydroxyacetanilide diacetate (1.51 g) was stirred in 10 ml of trifluoroacetic acid at 26° for 10 min to dissolve and then stirred an additional 10 min. Palladium 10% on carbon (0.5 g) catalyst was added and the mixture was hydrogenated for 45 min on a Vortex hydrogenator until the pressure remained constant. After filtration of the mixture the filtrate was evaporated to an oil. The residue dissolved in chloroform was washed with water, sodium bicarbonate solution, and saturated sodium chloride solution and dried by filtration through cotton. Evaporation of the solvent afforded a solid residue which was slurried in ether and filtered to afford 0.90 g of 7-chloro-1,3-dihydro-3-hydroxy-5-phenyl-2H-1,4-benzodiazepin-2-one, mp. 169°–170° dec.

The infrared spectrum of the product was identical to that of authentic material. The thin layer chromatograms of the powder in two solvent systems on silica plates were identical with that of authentic material. A single recrystallization from dimethylformamide and water afforded crystals that melt at 185°–186°.

EXAMPLE 6

3-Acetoxy-7-chloro-1,3-dihydro-5-phenyl-2H-1,4-benzodiazepin-2-one

To a slurry of 1.0 g (3.3 mmole) 7-chloro-1,3-dihydro-3-hydroxy-5-phenyl-2H-1,4-benzodiazepin-2-one 4-oxide, VI, in 20 ml of methylene chloride was added 4 ml of phosphorous trichloride and the mixture was heated at reflux for 45 min. The solvent and volatile products were evaporated on the rotary evaporator and the crude residue was dissolved in 20 ml of glacial acetic acid. Sodium acetate (0.6 g, mmole) was added and the solution was heated at 90° for 10 min. After evaporation of the solvent, the residue was partitioned in chloroform and water. The chloroform extract was washed with sodium bicarbonate, dried over magnesium sulfate and evaporated in vacuo. The residue dissolved in dichloromethane was treated with hexane to afford 500 mg of the 3-acetoxy-7-chloro-1,3-dihydro-5-phenyl-2H-1,4-benzodiazepin-2-one, mp. 209°–212° dec. The infrared spectrum and thin layer chromatogram (silica gel 1:1:8; ethanol:acetone:chloroform) of the product was identical to the spectrum of authentic material. Recrystallization of the sample from acetonitrile raised the melting point to that of authentic material.

EXAMPLE 7

4'-Chloro-2'-(o-chlorobenzoyl)-2,2-dihydroxyacetanilide diacetate anti-oxime

Saturated sodium bicarbonate solution (75 ml) was added at 5°C. to a vigorously stirred solution of 16.86 g (0.06 mole) of 2-amino-2',5-dichlorobenzophenone anti-oxime in dichloromethane (250 ml). To this mixture at 5°c. was added dropwise a solution of 13.66 g (0.0702 mole) of 2,2-dihydroxyacetyl chloride diacetate in 75 ml dichloromethane over a period of 0.75 hours. The mixture was stirred in an icebath for 3 hours, then separated. The organic phase was washed twice with saturated sodium chloride solution, dried and concentrated in vacuo. The residue was recrystallized from aqueous methanol to give 22.7 g (86.2% yield of 4'-chloro-2'-(o-chlorobenzoyl)-2,2-dihydroxyacetanilide diacetate anti-oxime, mp. 155°–157°C.

Analysis for $C_{19}H_{16}Cl_2N_2O_6$
Calculated: C, 51.98; H, 3.67; Cl, 16.14; N, 6.38.
Found: C, 51.90; H, 3.75; Cl, 16.13; N, 6.47.

The infrared spectrum (KBr) exhibited bands at 3.10 $\mu$, 5.62 (acetate CO), 5.89 (amide CO), and 6.5 (amide II).

The nuclear magnetic resonance spectrum ($CDCl_3$) had peaks at 2.08 (s, 6), 6.83 (d, 1, J=3Hz), 7.11 (s, 1), 7.2–7.6 (m, 5), 8.22 (d, 1, J=9Hz), 9.07 (s, 1) and 11.75 (s, 1).

EXAMPLE 8

Hydrolysis of 4'-chloro-2'-(o-chlorobenzoyl)-2,2-dihydroxyacetanilide diacetate, anti-oxime 4'-Chloro-2'-(o-chlorobenzoyl)-2,2-dihydroxyacetanilide diacetate anti-oxime (6.6 g., 0.015 mole) was dissolved in 52.5 ml of dimethoxyethane. Freshly prepared 4 N sodium hydroxide solution (7.5 ml, 0.030 mole) was added at room temperature over a period of 25 minutes. The mixture was stirred at room temperature for 45 minutes after the completed addition, then it was concentrated in a vacuo at 45°C. The residue was taken up in 150 ml of water and extracted with chloroform (1 portion, 150 ml and 3 portions, 100 ml each). The combined organic extracts were washed with saturated sodium chloride solution (3 portions, 50 ml each) and dried over anhydrous sodium sulfate. The solution was filtered and concentrated in vacuo at 45°C. to give 6.7 g of product. A 3.2 g sample of this product was finely ground in a mortar and dried overnight in vacuo at 56°C. to give 3.0 g solid melting at 163°–167°C.

Analysis for $C_{15}H_{10}Cl_2N_2O_3 \cdot 1/2 H_2O$
Calculated: 52.03; H, 3.20; Cl, 20,50; N, 8.10.
Found: 52.13; H, 3.51; Cl, 20.43; N, 7.47.

The infrared spectrum (KBr) exhibited bands at 3.0–3.25 $\mu$ (broad), 5.80 (shoulder), 5.87 (shoulder), 5.92 and 6.6 among other bands.

The nuclear magnetic resonance spectrum ($d_6$-DMSO) had absorptions at $\delta$ 5.1–6.0 (m, 1), 6.6 (m, 1), 6.7–8.0 (m, 6), 9.2–9.8 (m, 1) and 11.4–12.1 (m, 1).

EXAMPLE 9

7-Chloro-5-(o-chlorophenyl)-3-hydroxy-1,3-dihydro-2H-1,4-benzodiazepine-2-one

A mixture of 2.023 g (from Ex. 8) of the product obtained from hydrolysis of 4'-chloro-2'-(o-chlorobenzoyl)-2,2-dihydroxyacetanilide diacetate, anti-oxime and 20 ml of trifluoroacetic acid was stirred at room temperature for 3 hours. A clear solution was obtained. Palladium (10% on charcoal, 0.20 g) was added and the mixture hydrogenated at 40 psi until the pressure became constant (approximately 2.5 hr). The catalyst was filtered and washed with trifluoroacetic acid. The filtrate and washings were combined and concentrated in vacuo. The residue was taken up in a mixture of 1:1 chloroform-water (80 ml) and separated. The organic phase was washed with water 2 portions, 40 ml each), saturated sodium bicarbonate solution (40 ml), and water (40 ml). A solid formed in the organic phase during this procedures. The mixture was chilled overnight, then filtered. The solid was washed with water and dried to give 0.994 g of 7-chloro-5-(o-chlorophenyl)-3-hydroxy-1,3-dihydro-2H-1,4-benzodiazepine-2-one, dec. 120°–122°C. The infrared spectrum and thin layer chromatography results were identical with those of authentic material. Recrystallization of the product from benzene afforded crystals that sinter at 142°–144° and resolidify and melt at 165°–168°, the same as an authentic sample.

The subject matter which the applicant regards as his invention is particularly pointed out and distinctly claimed as follows:

1. A compound of the formula

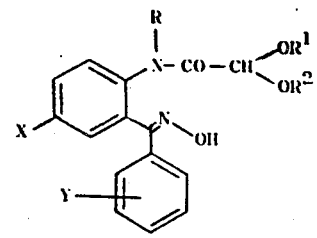

wherein R is hyrogen or alkyl of from 1 to 6 carbon atoms, $R^1$ and $R^2$ may be the same or different and are alkanoyl of from 1 to 6 carbon atoms, and X and Y may be the same or different and are selected from the group consisting of hydrogen, halogen, nitro, trifluoromethyl, thiomethyl, cyano, alkyl of from 1 to 6 carbon atoms and alkoxy of from 1 to 6 carbon atoms.

2. Compounds of claim 1 wherein R is hydrogen.

3. Compounds of claim 2 wherein $R^1$ and $R^2$ are acetyl.

4. The compound of claim 3, 4'-chloro-2'-benzoyl-2,2-dihydroxyacetanilide diacetate, anti-oxime.

5. The compound of claim 3, 4'-chloro-2'-(o-chlorobenzoyl)-2,2-dihydroxyacetanilide diacetate, anti-oxime.

* * * * *